(12) United States Patent
Zhu

(10) Patent No.: US 11,327,574 B2
(45) Date of Patent: May 10, 2022

(54) METHOD FOR CONTROLLING PLAY OF MULTIMEDIA FILE AND TERMINAL DEVICE

(71) Applicant: VIVO MOBILE COMMUNICATION CO., LTD., Guangdong (CN)

(72) Inventor: Yuxuan Zhu, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/210,908

(22) Filed: Mar. 24, 2021

(65) Prior Publication Data
US 2021/0208697 A1 Jul. 8, 2021

Related U.S. Application Data

(63) Continuation of application No. PCT/CN2019/099923, filed on Aug. 9, 2019.

(30) Foreign Application Priority Data

Sep. 26, 2018 (CN) .......................... 201811126022.7

(51) Int. Cl.
G06F 3/0338 (2013.01)
G06F 1/16 (2006.01)
(Continued)

(52) U.S. Cl.
CPC .......... *G06F 3/0338* (2013.01); *G06F 1/1641* (2013.01); *G06F 3/0484* (2013.01);
(Continued)

(58) Field of Classification Search
CPC .... G06F 1/1652; G06F 1/1694; G06F 1/3215; G06F 1/3262; G06F 1/3265;
(Continued)

(56) References Cited

U.S. PATENT DOCUMENTS

2005/0047069 A1  3/2005  Chu
2013/0120239 A1*  5/2013  Suzuki .................. G06F 1/1652
                                          345/156
(Continued)

FOREIGN PATENT DOCUMENTS

CN   105408850 A   3/2016
CN   105933775 A   9/2016
(Continued)

OTHER PUBLICATIONS

International Search Report and Written Opinion of the International Searching Authority regarding International Application No. PCT/CN2019/099923, dated Oct. 29, 2019. Translation provided by Bohui Intellectual Property.
(Continued)

*Primary Examiner* — Rayeez R Chowdhury
(74) *Attorney, Agent, or Firm* — Harness, Dickey & Pierce, P.L.C.

(57) ABSTRACT

A method for controlling play of a multimedia file, the method is applied to a terminal device including a first screen and a second screen, and includes: receiving a bending input by a user to a target screen, the bending input being used to trigger changing of a folding angle between the first screen and the second screen; and adjusting a play parameter of a target multimedia file in response to the bending input. The target screen is the first screen or the second screen, and the play parameter includes at least one of play progress or play speed.

20 Claims, 9 Drawing Sheets

(51) Int. Cl.
*G06F 3/0484* (2022.01)
*G06F 3/0487* (2013.01)
*G06F 3/14* (2006.01)
*H04M 1/02* (2006.01)

(52) U.S. Cl.
CPC .......... *G06F 3/0487* (2013.01); *G06F 3/1423* (2013.01); *H04M 1/0268* (2013.01)

(58) Field of Classification Search
CPC ........... G06F 2203/04102; G06F 3/017; G06F 3/0481; G06F 3/0482; G06F 3/04845; G06F 3/04886; G06F 1/1677; G06F 2203/04105; G06F 3/0416; G06F 3/04186; G06F 3/0446; G06F 3/04883; G06F 1/1643; G06F 1/1641; G06F 2203/04803; G06F 3/013; G06F 3/0488; G06F 16/44; G06F 16/745; G06F 16/7867; G09G 3/035
See application file for complete search history.

(56) References Cited

U.S. PATENT DOCUMENTS

| | | | | |
|---|---|---|---|---|
| 2013/0300686 A1* | 11/2013 | Yoon | ................... | G06F 3/04842 345/173 |
| 2014/0015743 A1* | 1/2014 | Seo | ........................ | G09G 3/035 345/156 |
| 2014/0347273 A1 | 11/2014 | Arrasvuori et al. | | |
| 2015/0009125 A1* | 1/2015 | Kim | ........................ | G06F 3/048 345/156 |
| 2015/0062025 A1 | 3/2015 | Lee et al. | | |
| 2015/0227173 A1* | 8/2015 | Hwang | ................. | G06F 1/1652 345/619 |
| 2016/0026381 A1* | 1/2016 | Kim | .................... | G06F 3/04886 715/761 |

FOREIGN PATENT DOCUMENTS

| | | | |
|---|---|---|---|
| CN | 106445228 A | | 2/2017 |
| CN | 107566641 A | | 1/2018 |
| CN | 107831993 A | * | 3/2018 |

OTHER PUBLICATIONS

First Chinese Office Action regarding Chinese Patent Application No. 201811126022.7, dated Oct. 28, 2019. Translation provided by Bohui Intellectual Property.
Second Chinese Office Action regarding Chinese Patent Application No. 201811126022.7, dated Apr. 15, 2020. Translation provided by Bohui Intellectual Property.
Notification to Grant Patent Right for Invention regarding Chinese Patent Application No. 201811126022.7, dated Sep. 10, 2020. Translation provided by Bohui Intellectual Property.

* cited by examiner

METHOD FOR CONTROLLING PLAY OF MULTIMEDIA FILE AND TERMINAL DEVICE

CROSS-REFERENCE TO RELATED APPLICATIONS

This application is a Bypass Continuation Application of PCT/CN2019/099923 filed on Aug. 9, 2019, which claims priority to Chinese Patent Application No. 201811126022.7 filed on Sep. 26, 2018, which are incorporated herein by reference in their entirety.

TECHNICAL FIELD

Embodiments of this disclosure relate to the field of communications technologies, and in particular, to a method for controlling play of a multimedia file and a terminal device.

BACKGROUND

Currently, to control video play on a mobile phone, a user generally uses a finger to slide a slider on a progress bar or slide on a screen, or performs fixed-time fast forward and fast backward operations.

SUMMARY

According to a first aspect, a method for controlling play of a multimedia file is provided, where a terminal device includes a first screen and a second screen, and the method includes:

receiving a bending input by a user to a target screen, the bending input being used to trigger changing of a folding angle between the first screen and the second screen; and adjusting a play parameter of a target multimedia file in response to the bending input, where the target screen is the first screen or the second screen, and the play parameter includes at least one of play progress or play speed.

According to a second aspect, a terminal device is provided, including a first screen and a second screen, and further including: a receiving unit, configured to receive a bending input by a user to a target screen, the bending input being used to trigger changing of a folding angle between the first screen and the second screen; and an adjusting unit, configured to adjust a play parameter of a target multimedia file in response to the bending input, where the target screen is the first screen or the second screen, and the play parameter includes at least one of play progress or play speed.

According to a third aspect, a non-transitory computer-readable storage medium is further provided, where the non-transitory computer-readable storage medium stores a computer program, and when the computer program is executed by a processor, the steps of the method according to the first aspect are implemented.

DESCRIPTION OF EMBODIMENTS

The following clearly describes the technical solutions in the embodiments of this disclosure with reference to the accompanying drawings in the embodiments of this disclosure. The described embodiments are some rather than all of the embodiments of this disclosure. All other embodiments obtained by a person of ordinary skill in the art based on the embodiments of this disclosure shall fall within the protection scope of this disclosure.

In one aspect, for general slider controlling method, it is difficult to control the slider to stop at a specific position. When a finger reaches a desired position and leaves, because of the characteristic that skin of the finger is in contact with the phone screen in a plane rather than a point, the position often jumps due to a change of the contact surface after the finger leaves. Consequently, the adjusted play position is not the play position desired by the user, or even is far away from the play position desired by the user. Furthermore, when the finger is in a sliding operation, the video play screen might be blocked. In another aspect, because fixed-time fast forward and fast backward operations are subject to significant constraints, they do not allow flexible adjustment, and therefore a play speed desired by the user is generally unattained.

The technical solutions provided in the embodiments of this disclosure are described in detail below with reference to the accompanying drawings.

Figure 1:
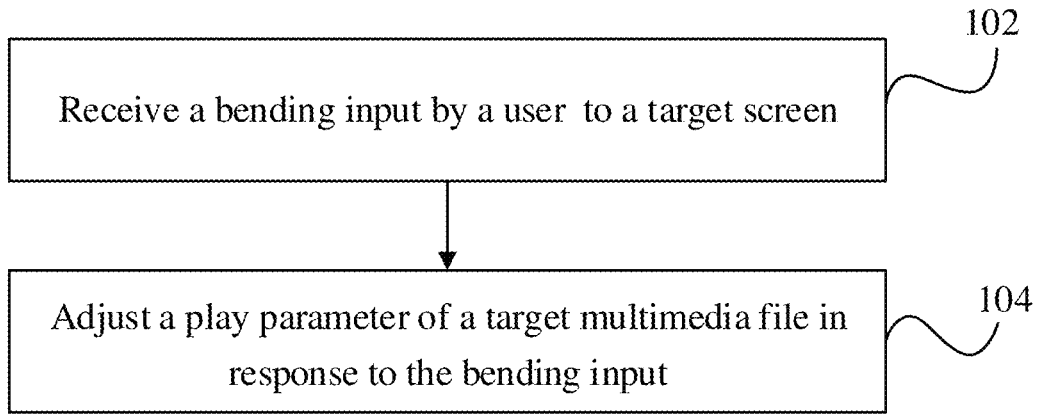
FIG. 1 is a schematic flowchart of a method for controlling play of a multimedia file according to an embodiment of this disclosure.

FIG. 1 is a schematic flowchart of a method for controlling play of a multimedia file according to an embodiment of this disclosure, so as to resolve the prior-art problem of play position jump caused by adjusting video play progress with a finger to touch a screen. The method according to this embodiment of this disclosure is applied to a terminal device including a first screen and a second screen. The method may include the following steps.

Generally, a user will not desire to adjust play progress of a video before opening and playing the video on a terminal device and getting ready to watch it. The terminal device may include a first screen and a second screen. For example, the terminal device may be a mobile phone with a foldable screen.

Step 102. Receive a bending input by a user to a target screen, the bending input being used to trigger changing of a folding angle between the first screen and the second screen.

Step 104. Adjust a play parameter (for example, at least one of play progress or play speed) of a target multimedia file in response to the bending input. The target screen is the first screen or the second screen.

It should be understood that when the user has already opened and is playing the video on the terminal device, the user may adjust the play progress or speed of the video by folding one of the two screens (or folding the two screens at the same time) (that is, a bending input by the user to the target screen).

It can be learned that, in the method for controlling play of a multimedia file according to this embodiment of this disclosure, the bending input by the user to the target screen (the bending input triggering changing of the folding angle between the first screen and the second screen) is received so as to adjust the play parameter (for example, at least one of play progress or play speed) of the target multimedia file. In this way, with the method according to this embodiment of this disclosure, the play progress or play speed of the multimedia file can be adjusted simply by triggering changing of the folding angle between the first screen and the second screen, without requiring the user to touch or slide on a screen of the terminal device to implement functions such as fast forward and fast backward play of a video.

To be specific, when watching a video, the user can control its play progress and play speed by folding another screen. This makes the control more accurate and flexible, sparing the worry about a finger blocking the play screen during the operation.

Figure 2:
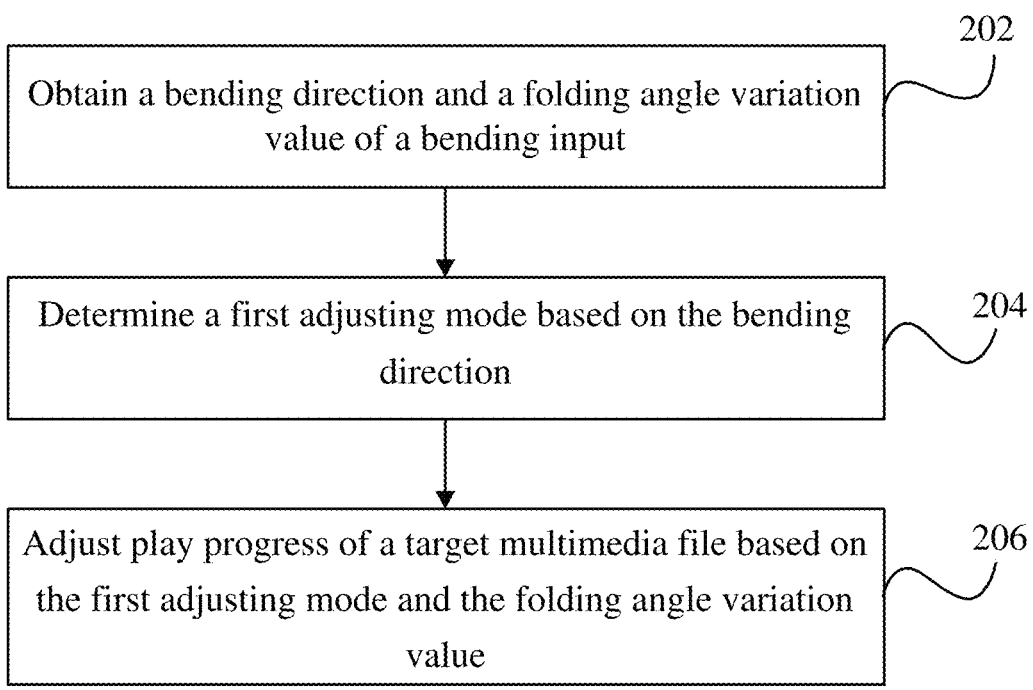
FIG. 2 is a schematic flowchart of a method for controlling play of a multimedia file according to another embodiment of this disclosure.

As shown in FIG. 2, the operation of adjusting a play parameter of a target multimedia file in response to the bending input in step 104 may include the following steps.

Step 202. Obtain a bending direction and a folding angle variation value of the bending input.

The bending direction may be a direction towards or away from the user, towards a left or right direction to the user when the user normally uses the terminal device, or the like. The folding angle may become larger or smaller with changing of the bending direction. Of course, a trend in which the folding angle changes with the bending direction may be set based on the user's use habits or other specified rules.

Step 204. Determine a first adjusting mode based on the bending direction.

For example, in the case of bending towards the left direction to the user when the user normally uses the terminal device, the first adjusting mode may be fast backward adjustment, while in the case of bending towards the right direction to the user when the user normally uses the terminal device, the first adjusting mode may be fast forward adjustment. Alternatively, in the case of bending in a direction towards the user, the first adjusting mode may be fast forward adjustment, while in the case of bending in a direction away from the user, the first adjusting mode may be fast backward adjustment.

Step 206. Adjust the play progress of the target multimedia file based on the first adjusting mode and the folding angle variation value.

It should be understood that when performing a bending input operation to the target screen, the user can first obtain the direction and the folding angle variation value of the bending input, and determine the adjusting mode (for example, fast forward or fast backward) based on the folding direction, so that the play progress of the target multimedia file can be adjusted based on the adjusting mode and the folding angle variation value, without requiring the user to touch or slide on a screen of the terminal device to change the video play progress.

In some embodiments, the operation of adjusting the play progress of the target multimedia file based on the first adjusting mode and the folding angle variation value may include:

in a case that the first adjusting mode is fast forward adjustment, controlling, based on the folding angle variation value, the play progress of the target multimedia file to move fast forward, where fast forward duration is correlated with the folding angle variation value; and in a case that the first adjusting mode is fast backward adjustment, controlling, based on the folding angle variation value, the play progress of the target multimedia file to move fast backward, where fast backward duration is correlated with the folding angle variation value.

In other words, in the case that the first adjusting mode is fast forward or fast backward adjustment, when the user starts to perform bending, a bending start position is recorded and an angle between the screens before and after the bending is refreshed and calculated. The refreshed position is used as the bending start position at each frame refresh. The system can move the progress bar forward or backward by a specific proportion based on played duration of the multimedia file and the folding angle (for example, when the frame refresh rate is 30 FPS, the progress bar can move forward or backward 1% for each 1-degree bending).

It should be understood that it may be defined that the play progress of the multimedia file may be controlled to move backward if the folding angle between the first screen and the second screen decreases. The play progress of the multimedia file may be controlled to move forward if the folding angle between the first screen and the second screen increases. In other words, when the two screens are folded close to each other, the play progress of the multimedia file may be controlled to move backward, and on the contrary, when the two screens are folded away from each other, the play progress of the multimedia file may be controlled to move forward.

Of course, matching between the bending direction and whether the play progress moves fast forward or fast backward can be set based on actual needs (for example, user habits), without being limited to the case defined in this embodiment. To be specific, it may be defined that when the two screens are folded close to each other, the play progress of the multimedia file may be controlled to move forward, while when the two screens are folded away from each other, the play progress of the multimedia file may be controlled to move backward.

In the foregoing embodiment, the target multimedia file is a file played by a multimedia play interface displayed on at least one of the first screen or second screen, where the multimedia play interface may include a progress bar for adjusting the multimedia play progress. In this case, the adjusting the play progress of the target multimedia file based on the first adjusting mode and the folding angle variation value may further include:

updating a display position of a slider on the progress bar based on the first adjusting mode and the folding angle variation value.

For example, when backward play is needed, the two screens may be folded close to each other, and the play progress bar (or slider) moves backward. To be specific, when the user starts to perform folding, based on a folding start position recorded, an angle between the two screens before and after the folding may be refreshed and calculated. The refreshed position is used as the folding start position at each frame refresh. The system can move the progress bar backward by a specific proportion based on video duration and the angle. For example, when the frame refresh rate is 30 FPS, the progress bar can move backward 1° for each 1° folding, or the progress bar moves backward 2° for each 2° folding, or the progress bar moves backward 3° for each 3° folding, or the progress bar moves backward 4° for each 4° folding, or the progress bar moves backward 5° for each 5° folding, and so on. Other examples are not given one by one herein.

Similarly, when fast play is needed, the two screens may be folded away from each other, and the play progress bar (or slider) moves forward. To be specific, when the user starts to perform folding, based on a folding start position recorded, an angle between the two screens before and after the folding can be refreshed and calculated in real time. The refreshed position is used as the folding start position at each frame refresh. The system can move the progress bar forward by a specific proportion based on the video duration and the angle. For example, when the frame refresh rate is 30 FPS, the progress bar moves forward 1% for each 1° folding.

It can be learned that, with the method in any one of the foregoing embodiments of this application, the play progress of the multimedia file can be adjusted simply by folding at least one of the first screen or the second screen, without requiring the user to touch or slide on a screen of the terminal device to implement fast forward or fast backward play of a video. Therefore, the problem of play position jump in related technologies caused by adjusting video play progress with a finger to touch a screen can be resolved, where the problem of play position jump causes that a final play position is not a play position desired by the user, or even far away from the play position desired by the user. To be specific, when the user is watching a video, play progress of the video can be adjusted and controlled by folding one of the screens, to reach a play position from which the user wants watch the video.

Furthermore, this disclosure also resolves the inability to make flexible adjustment in related technologies with the scheme of controlling play progress using fixed-time fast forward and fast backward operations because fixed-time fast forward and fast backward operations are subject to significant constraints.

Figure 3:
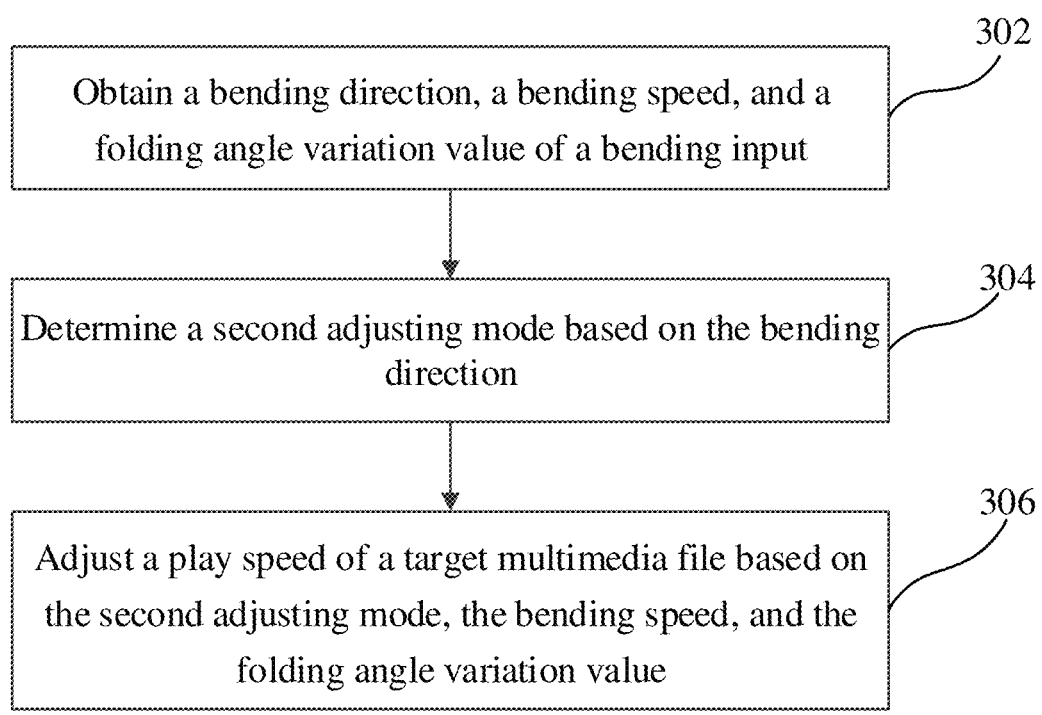
FIG. 3 is a schematic flowchart of a method for controlling play of a multimedia file according to still another embodiment of this disclosure.
Figure 4A:
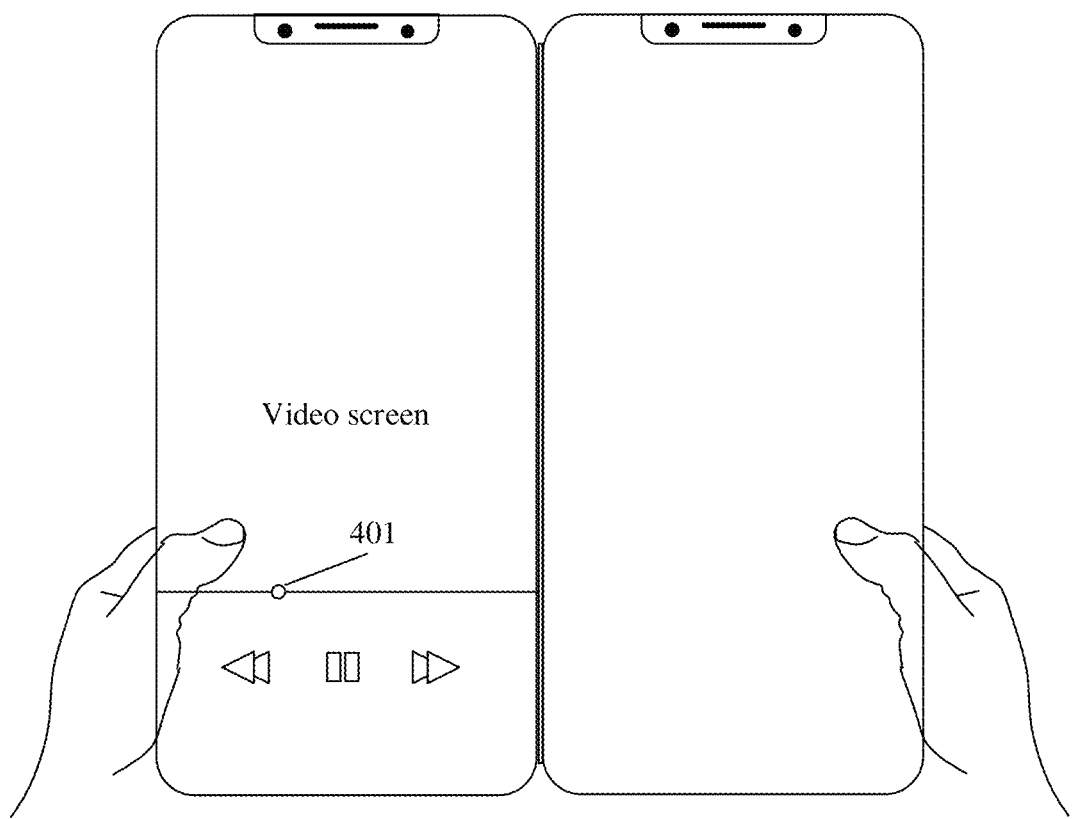
FIG. 4A is a schematic diagram showing a multimedia file play interface according to an embodiment of this disclosure.
Figure 4B:
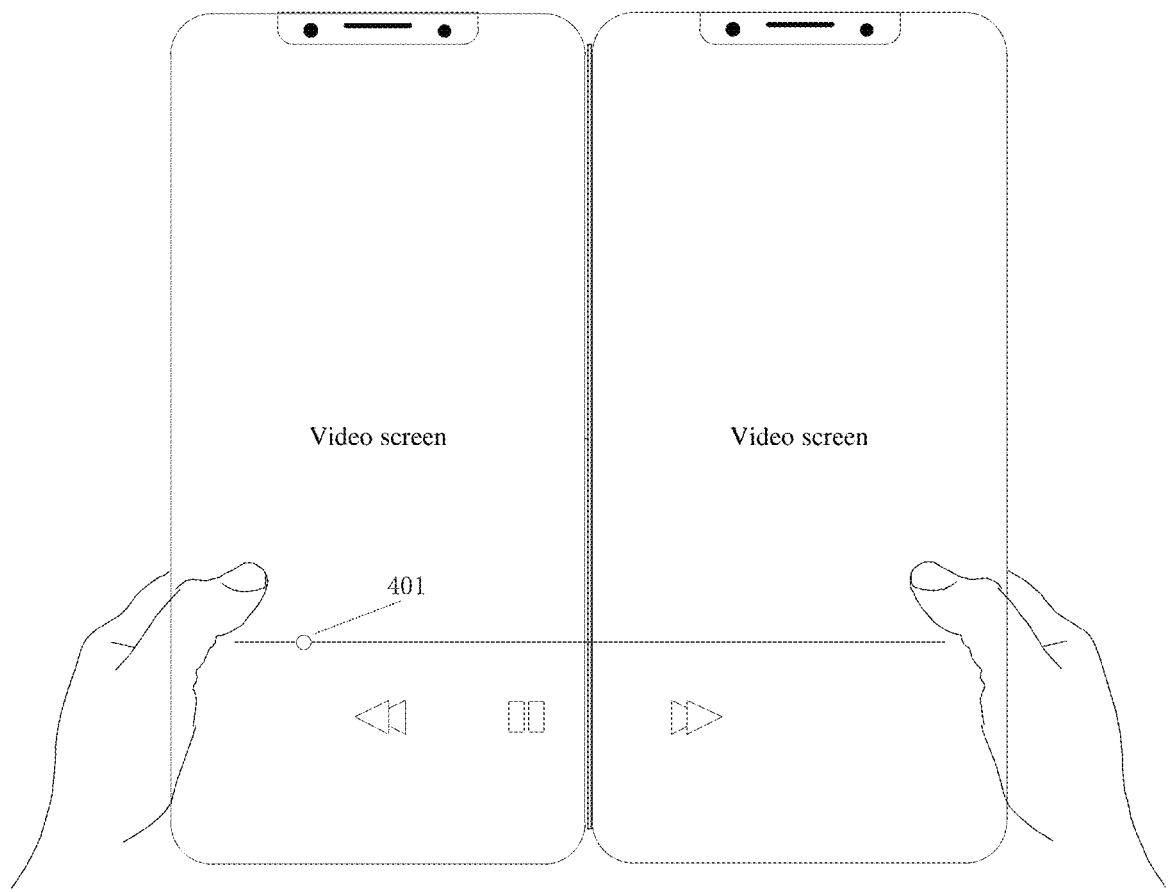
FIG. 4B is a schematic diagram showing a multimedia file play interface according to another embodiment of this disclosure.

In an embodiment of FIG. 3, the operation of adjusting a play parameter of a target multimedia file in response to the bending input in step 104 may include the following steps.

Step 302. Obtain a bending direction, a bending speed, and a folding angle variation value of the bending input.

The bending direction may be a direction towards or away from the user, towards a left or right direction to the user when the user normally uses the terminal device, or the like. The bending speed generally depends on a speed at which the user bends the first screen or the second screen when using the terminal device. The folding angle may become larger or smaller with changing of the bending direction. Of course, a trend in which the folding angle changes with the bending direction may be set based on the user's use habits or other specified rules.

Step 304. Determine a second adjusting mode based on the bending direction.

For example, in the case of bending towards the left direction to the user when the user normally uses the terminal device, the second adjusting mode may be fast backward adjustment (or to distinguish it from the first adjusting mode, the second adjusting mode may be called fast backward play adjustment), while in the case of bending towards the right direction to the user when the user normally uses the terminal device, the second adjusting mode may be fast forward adjustment (or called fast forward play adjustment).

Step 306. Adjust the play speed of the target multimedia file based on the second adjusting mode, the bending speed, and the folding angle variation value.

It should be understood that when performing a bending input operation to the target screen, the user can first obtain the direction, the bending speed, and the folding angle variation value of the bending input, and determine the adjusting mode (for example, fast forward or fast backward) based on the folding direction, so that the play progress of the target multimedia file can be adjusted based on the second adjusting mode, the bending speed, and the folding angle variation value, without requiring the user to touch or slide on a screen of the terminal device to change the video play speed.

In some embodiments, the operation of adjusting the play speed of the target multimedia file based on the second adjusting mode, the bending speed, and the folding angle variation value in step 306 may include:

in a case that the second adjusting mode is fast forward adjustment, controlling, based on the bending speed and the folding angle variation value, the target multimedia file to be played fast forward, where a fast forward rate is correlated with the bending speed, and fast forward duration is correlated with the folding angle variation value; and in a case that the second adjusting mode is fast backward adjustment, controlling, based on the bending speed and the folding angle variation value, the target multimedia file to be played fast backward, where a fast backward rate is correlated with the bending speed, and fast backward duration is correlated with the folding angle variation value.

It should be understood that when backward play is needed, the two screens may be folded close to each other, and then restored to their original positions (the positions before the play progress of the multimedia file is adjusted, or the positions before the two screens are folded close to each other), and the video is played fast backward at a specific rate.

The fast backward play is performed at different rates (for example, 0.5-times, 2-times, and 4-times) based on the speed of the bending or folding operation. The system may record the positions before folding, and calculate a folding time after restoration from the folding. A shorter time indicates a faster speed. Different fast backward rates may be output based on a plurality of preset thresholds. For example, a speed greater than value 1 indicates a 0.5-times play speed, a speed between value 1 and value 2 indicates a 2-times play speed, and a speed greater than value 2 indicates a 4-times play speed. Subsequently, the system may perform fast backward play at a rate based on an obtained value. Both value 1 and value 2 are preset thresholds.

Similarly, when fast forward play is needed, the two screens may be folded away from each other and restored to their original positions, and then the video is played fast forward at a specific rate. The fast forward play is performed at different rates (for example, 0.5-times, 2-times, and 4-times) based on the speed of the bending or folding operation. The system may record the positions before folding, and calculate a folding time after restoration from the folding. A shorter time indicates a faster speed. Different fast forward rates may be output based on a plurality of preset thresholds. For example, a speed greater than value 1 indicates a 0.5-times play speed, a speed between value 1 and value 2 indicates a 2-times play speed, and a speed greater than value 2 indicates a 4-times play speed. Subsequently, the system may perform fast forward play at a rate based on an obtained value.

It should be understood that the bending direction or the folding direction may be changed based on user habits. For example, in the original way, front-folding (that is, folding close to each) indicates a backward movement, which can be changed to that back-folding (that is, folding away from each other) indicates a backward movement; and back-folding indicates fast forward, which can be changed to that front-folding indicates fast forward.

It can be learned that, with the method according to this embodiment of this disclosure, a video can be played fast forward or fast backward at different rates based on the folding speed, and the folding direction can be selected based on user preferences. This makes play control operations more flexible to better satisfy user needs.

To be specific, this embodiment of this disclosure can achieve backward play and fast forward play at different speeds when a video is played based on different screen folding speeds.

In a further embodiment of the foregoing embodiment, the method according to the embodiments of this disclosure may further include:

playing the adjusted multimedia file if no folding operation to at least one of the first screen or the second screen is detected within a preset time period; or playing the adjusted multimedia file in response to a touch operation of the user.

To be specific, after the user stops folding the screen, the movement of the play progress slider stops. The system automatically continues to play the video if detecting no sliding operation within the specified time. Alternatively, the user may click the play button to continue to play the video.

An embodiment is illustrated with reference to FIG. 4A to FIG. 7. The method for adjusting play progress of a multimedia file according to this embodiment of this disclosure may be implemented in the following process.

Step 1. A user opens and plays a video. The user uses a mobile phone with a foldable screen to open and play the video. See the video screen in FIG. 4A.

Step 2. A terminal device such as a system of a mobile phone, automatically pauses the play when detecting a folding operation to another screen while the video is being played on one screen. In this case, the user may fold a screen to adjust play progress of the video.

Step 3. The user folds a screen to manipulate the play progress.

Figure 5:
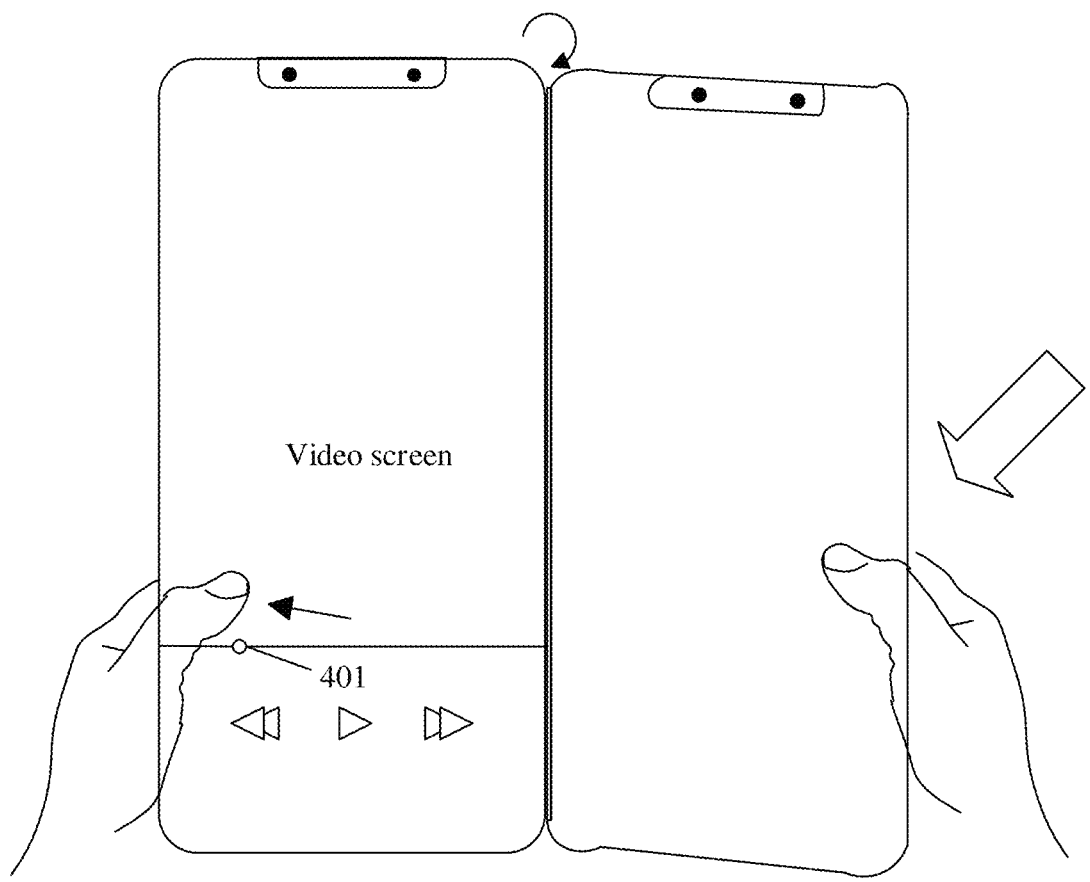
FIG. 5 is a schematic diagram showing a multimedia file play interface according to another embodiment of this disclosure.

Bring the play progress backward: front-folding the screen (folding the two screens close to each other) makes a play progress slider 401 move backward, as shown in FIG. 5. When the user performs folding, a folding start position is recorded and an angle between the two screens before and after the folding can be refreshed and calculated in real time. The refreshed position is used as the folding start position at each frame refresh. The system can move the progress bar backward by a specific proportion based on video duration and the angle. For example, when the frame refresh rate is 30 FPS, the progress bar moves backward 1° for each 1° folding.

Figure 6:
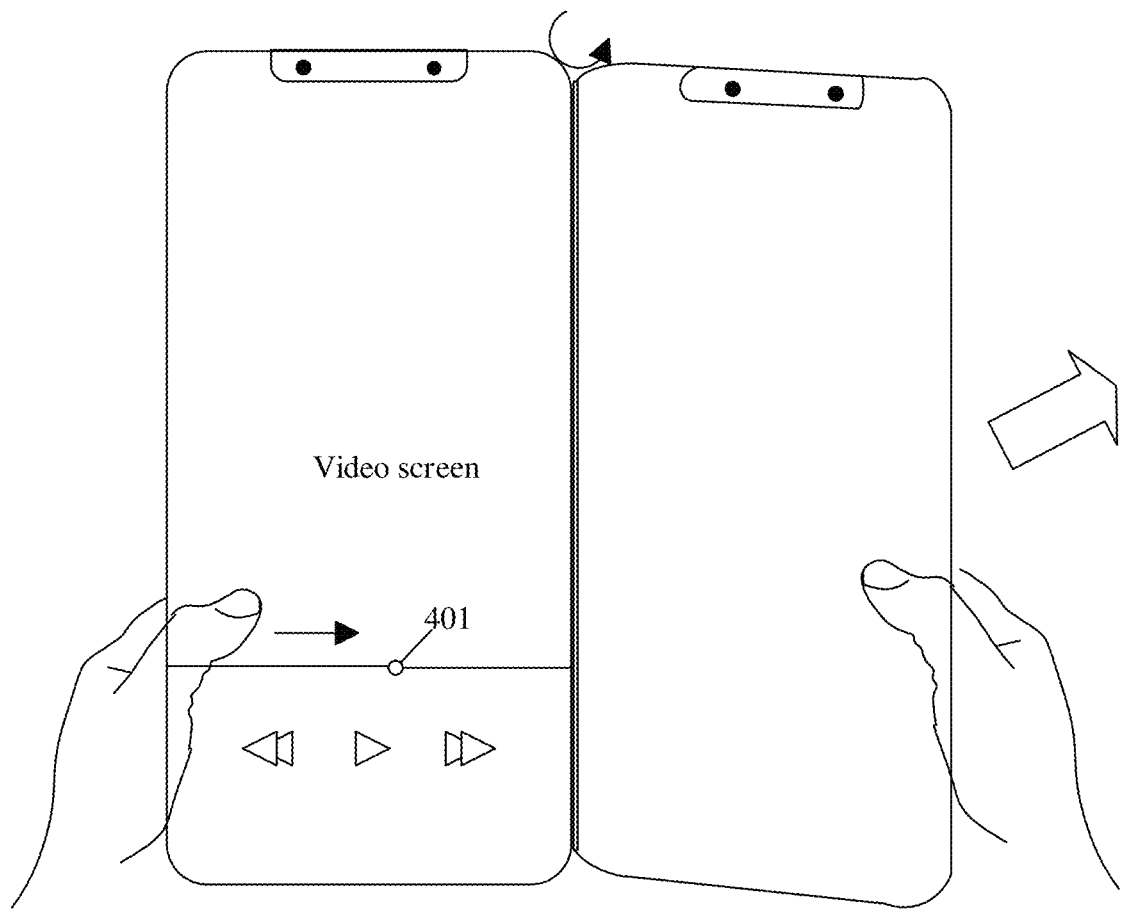
FIG. 6 is a schematic diagram showing a multimedia file play interface according to still another embodiment of this disclosure.
Figure 7:
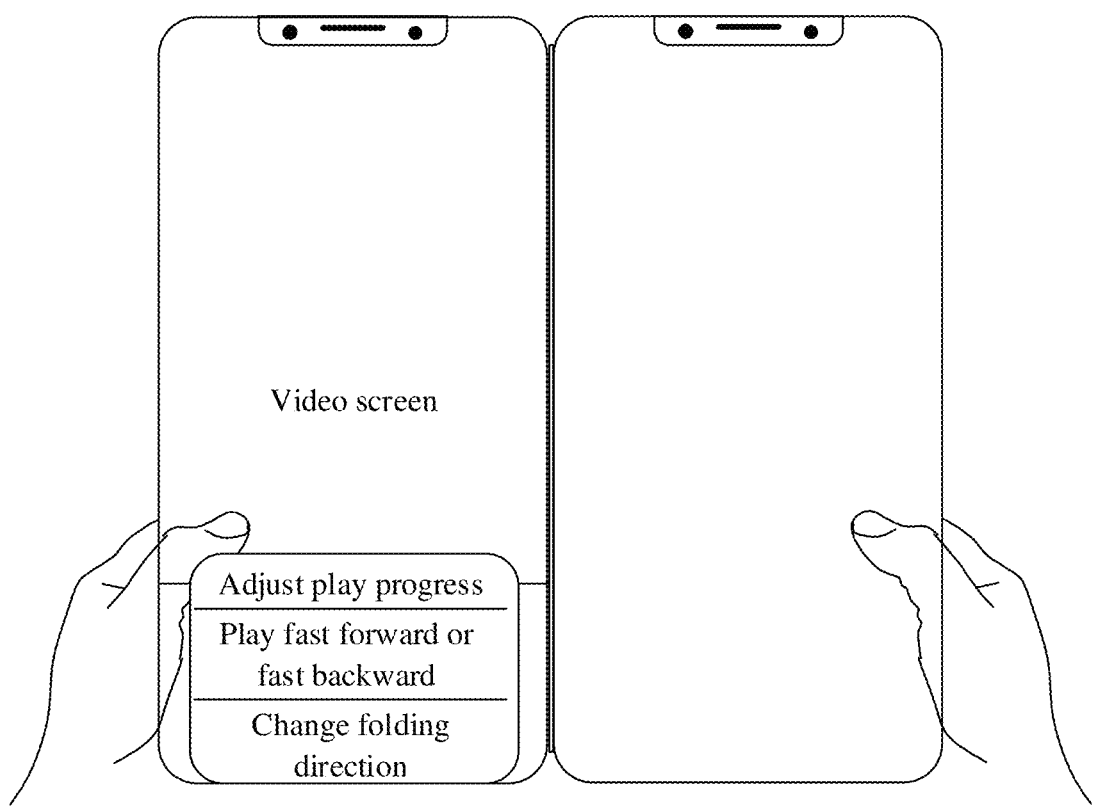
FIG. 7 is a schematic diagram showing a multimedia file play interface according to yet another embodiment of this disclosure.

Bring the play progress forward: back-folding the screen (folding the two screens away from each other) makes the play progress slider 401 move forward, as shown in FIG. 6. When the user performs folding, a folding start position is recorded and an angle between the two screens before and after the folding can be refreshed and calculated in real time. The refreshed position is used as the folding start position at each frame refresh. The system moves the progress bar forward by a specific proportion based on the video duration and the angle. For example, when the frame refresh rate is 30 FPS, the progress bar moves forward 1% for each 1° folding.

Step 4. The video play control is completed and the video continues to be played. After the user stops folding the screen, the movement of the play progress slider 401 stops. The system automatically continues to play the video if detecting no sliding operation within a specified time, or the user clicks the play button to continue to play the video.

It can be learned that, with the method according to the embodiments of this disclosure, when a video is watched, the play progress of the video can be adjusted by folding one of the screens, to reach a play position from which the user wants to watch the video. To be specific, when watching a video, the user can control its play progress by folding one screen. This makes the control more accurate and flexible, sparing the worry about a finger blocking the play screen during the operation.

Another embodiment is illustrated with reference to FIG. 4A to FIG. 7. This embodiment is different from the foregoing embodiment in that in this embodiment of this disclosure, the backward play speed or fast forward play speed can be controlled based on a speed of folding the screen. The method according to this embodiment of this disclosure may be implemented in the following process.

Firstly, a user opens and plays a video. The user uses a mobile phone with a foldable screen to open and play the video.

Secondly, a system automatically pauses the play when detecting a folding operation to another screen while the video is being played, and pops up a menu to allow the user to select an operation function for screen folding. In this case, the user may fold a screen to adjust play progress of the video.

The user selects an operation function and folds a screen to manipulate the play progress.

For operations on adjusting the play progress, refer to the implementation process described in the foregoing embodiment, and details are not described herein again.

Fast backward operation: front-folding the screens (folding close to each other), and restoring the screens to their original positions (the positions before the play progress of the multimedia file is adjusted, or the positions before the two screens are folded close to each other). In this case, the video can be played fast backward at a specific rate, and the fast backward play is performed at different rates (for example, 0.5-times, 2-times, and 4-times) based on the folding speed (or the speed at which the progress bar moves).

The system of the terminal device may record the position before folding, and calculate a folding time after restoration from the folding. A shorter time indicates a faster speed. Then, different fast backward rates may be output based on a plurality of preset thresholds. For example, a speed greater than value 1 indicates a 0.5-times play speed, a speed between value 1 and value 2 indicates a 2-times play speed, and a speed greater than value 2 indicates a 4-times play speed. Finally, the system may perform fast backward play at the obtained rate.

About operations of fast forward play: back-folding the screens (away from each other), and restoring the screens to their original positions (the positions before the play progress of the multimedia file is adjusted, or the positions before the two screens are folded close to each other). The video can be played fast forward at a specific rate, and the fast forward play is performed at different rates (for example, 0.5-times, 2-times, and 4-times) based on the folding speed.

For example, the system of the terminal device may record the positions before folding, and calculate a folding time after the folding is restored. A shorter time indicates a faster speed. Then, different fast forward multiples may be output based on a plurality of thresholds, for example, a speed greater than value 1 indicates a 0.5-times play speed, a speed between value 1 and value 2 indicates a 2-times play speed, and a speed greater than value 2 indicates a 4-times play speed. Subsequently, the system may perform fast forward play at a rate based on an obtained value.

In the foregoing implementation process of the method, the folding direction may be changed based on user habits. For example, in the method of the foregoing embodiment, front-folding the screens indicates a backward movement, which can be changed to that back-folding indicates a backward movement; while in the method of the foregoing embodiment, back-folding the screens indicates fast forward, which can be changed to that front-folding indicates fast forward.

Thirdly, the video play control is completed and the video continues to be played. To be specific, the user stops folding the screen, and a normal play speed may be resumed to play the video at the normal speed.

It can be learned that, with the method according to the embodiments of this disclosure, not only the effects of the foregoing specific embodiments can be achieved, but also the video can be played fast forward or fast backward at different rates based on the folding speed. In addition, the folding direction can be selected based on user preferences. This makes play control operations more flexible to better satisfy user needs. To be specific, when watching a video, the user can control its play progress and play speed by folding one screen. This makes the control more accurate and flexible, sparing the worry about a finger blocking the play screen during the operation.

To be specific, according to the embodiments of this disclosure, a video can be played backward and fast forward at different speeds based on different screen folding speeds. In both FIG. 5 and FIG. 6, the left screen is used for video play and the right screen is used for operations. However, the embodiments of this disclosure are also applicable where the right screen is used for video play and the left screen is used for operations.

The multimedia file described in any one of the foregoing embodiments may be an audio file, or a video file, or the like.

Figure 8:
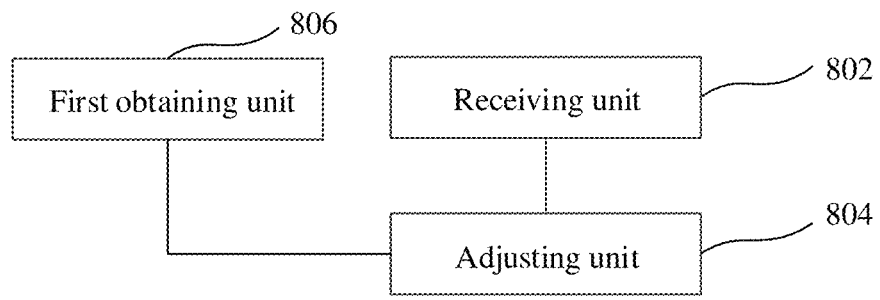
FIG. 8 is a schematic structural block diagram of a terminal device according to an embodiment of this disclosure.

An embodiment of this disclosure further provides a terminal device, including a first screen and a second screen. As shown in FIG. 8, the terminal device further includes: a receiving unit 802, configured to receive a bending input by a user to a target screen, the bending input being used to trigger changing of a folding angle between the first screen and the second screen; and an adjusting unit 804, configured to adjust a play parameter of a target multimedia file in response to the bending input, where the target screen is the first screen or the second screen, and the play parameter includes at least one of play progress or play speed.

The terminal device receives the bending input by the user to the target screen through the receiving unit 802 (the bending input triggering changing of the folding angle change between the first screen and the second screen) to adjust the play parameter (for example, at least one of play progress or play speed) of the target multimedia file through the adjusting unit 804. In this way, the terminal device according to this embodiment of this application can adjust the play progress or play speed of the multimedia file simply by folding at least one of the first screen or the second screen, without requiring the user to touch or slide on a screen of the terminal device to implement functions such as fast forward and fast backward play of a video. Therefore, the problem of play position jump in related technologies caused by adjusting video play progress with a finger to touch a screen can be resolved, where the problem of play position jump causes that a final play position is not a play position desired by the user.

In the foregoing embodiment, as shown in FIG. 8, the terminal device further includes a first obtaining unit 806 configured to obtain a bending direction and a folding angle variation value of the bending input. The adjusting unit 804 can be configured to determine a first adjusting mode based on the bending direction, and adjust the play progress of the target multimedia file based on the first adjusting mode and the folding angle variation value. The adjusting unit 804 is further configured to: in a case that the first adjusting mode is fast forward adjustment, control, based on the folding angle variation value, the play progress of the target multimedia file to move fast forward, where fast forward duration is correlated with the folding angle variation value; and in a case that the first adjusting mode is fast backward adjustment, control, based on the folding angle variation value, the play progress of the target multimedia file to move fast backward, where fast backward duration is correlated with the folding angle variation value.

It should be understood that when performing a bending input operation to the target screen, the user first obtains the direction and the folding angle variation value of the bending input through the first obtaining unit 806, and determines the adjusting mode (for example, fast forward or fast backward) based on the folding direction through the adjusting unit 804, so that the play progress of the target multimedia file can be adjusted based on the adjusting mode and the folding angle variation value, without requiring the user to touch or slide on a screen of the terminal device to change video play progress.

In any one of the foregoing embodiments, the target multimedia file may be a file played by a multimedia play interface displayed on at least one of the first screen or second screen, where the multimedia play interface includes a progress bar for adjusting the multimedia play progress. The adjusting unit 804 can be further configured to:

update a display position of a slider on the progress bar based on the first adjusting mode and the folding angle variation value.

In other words, when the target multimedia file is played backward, the play progress bar (or slider) moves backward. When the target multimedia file is played fast forward, the play progress bar (or slider) moves forward. In this way, from the display position of the play progress bar, the play position of the target multimedia file can be learned. In other words, when a play parameter of the target multimedia file is adjusted, the display position of the progress bar matches the play position after the play parameter adjustment.

Figure 9:
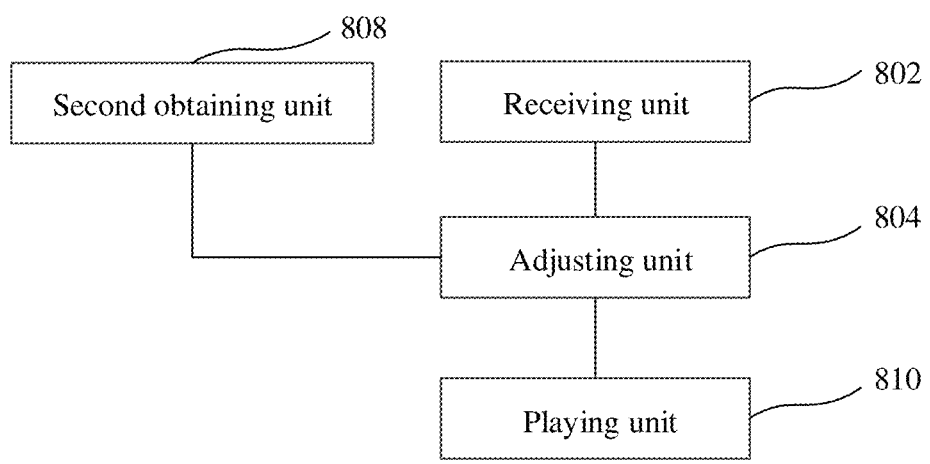
FIG. 9 is a schematic structural block diagram of a terminal device according to another embodiment of this disclosure.

In an embodiment shown in FIG. 9, the terminal device according to the embodiments of this disclosure may further include a second obtaining unit 808 configured to obtain a bending direction, a bending speed, and a folding angle variation value of the bending input, in response to the bending input. The adjusting unit 804 may be further configured to determine a second adjusting mode based on the bending direction, and adjust the play speed of the target multimedia file based on the second adjusting mode, the bending speed, and the folding angle variation value.

When performing a bending input operation to the target screen, the user can first obtain the direction, the bending speed, and the folding angle variation value of the bending input through the second obtaining unit 808, and determine the adjusting mode (for example, fast forward or fast backward) based on the folding direction through the adjusting unit 804, so that the play speed of the target multimedia file can be adjusted based on the second adjusting mode, the bending speed, and the folding angle variation value, without requiring the user to touch or slide on a screen of the terminal device to change the video play speed.

The adjusting unit 804 is further configured to: in a case that the second adjusting mode is fast forward adjustment, control, based on the bending speed and the folding angle variation value, the target multimedia file to be played fast forward, where a fast forward rate is correlated with the bending speed, and fast forward duration is correlated with the folding angle variation value; and in a case that the second adjusting mode is fast backward adjustment, control, based on the bending speed and the folding angle variation value, the target multimedia file to be played fast backward, where a fast backward rate is correlated with the bending speed, and fast backward duration is correlated with the folding angle variation value.

It can be learned that, with the method according to this embodiment of this disclosure, a video can be played fast forward or fast backward at different rates based on the folding speed, and the folding direction can be selected based on user preferences. This makes play control operations more flexible to better satisfy user needs.

In any one of the foregoing embodiments, the terminal device may further include a playing unit 810, which may be configured to play the adjusted target multimedia file if no folding operation to at least one of the first screen or the second screen is detected within a preset time period; or play the adjusted target multimedia file in response to a touch operation of the user.

To be specific, after the user stops folding the screen, the movement of the play progress slider stops. The playing unit 810 automatically continues to play the video if the system detects no sliding operation within the specified time. Alternatively, the video may continue to be played after the user clicks a play button.

Figure 10:
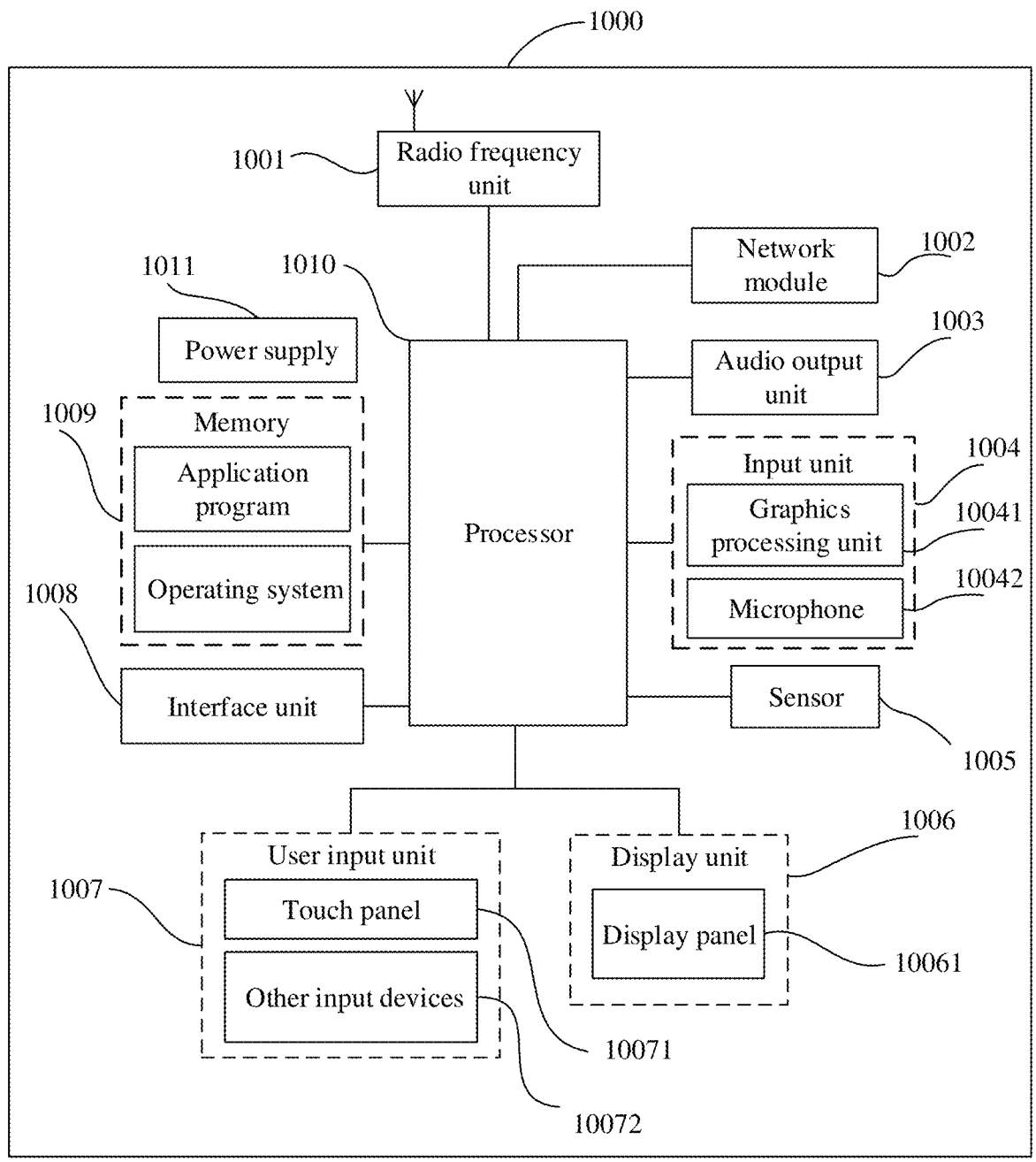
FIG. 10 is a schematic structural diagram of a terminal device according to still another embodiment of this disclosure.

FIG. 10 is a schematic diagram of a hardware structure of a terminal device according to an embodiment of this disclosure. As shown in FIG. 10, the terminal device 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, a processor 1010, and a power supply 1011. A person skilled in the art may understand that a structure of the terminal device shown in FIG. 10 does not constitute a limitation on the terminal device. The terminal device may include more or fewer components than those shown in the figure, or some components are combined, or component arrangements are different. In this embodiment of this disclosure, the terminal device includes but is not limited to a mobile phone, a tablet computer, a laptop computer, a palmtop computer, an in-vehicle terminal, a wearable device, a pedometer, and the like.

The processor 1010 is configured to:

receive a bending input by a user to a target screen, the bending input being used to trigger changing of a folding angle between a first screen and a second screen; and adjust a play parameter of a target multimedia file in response to the bending input, where the target screen is the first screen or the second screen, and the play parameter includes at least one of play progress or play speed.

In the method for controlling play of a multimedia file, the bending input by the user to the target screen (the bending input triggering changing of the folding angle change between the first screen and the second screen) is received so as to adjust the play parameter (for example, at least one of play progress or play speed) of the target multimedia file. In this way, with the method according to this embodiment of this disclosure, the play progress or play speed of the multimedia file can be adjusted simply by triggering changing of the folding angle between the first screen and the second screen, without requiring the user to touch or slide on a screen of the terminal device to implement functions such as fast forward and fast backward play of a video. Therefore, the problem of play position jump in related technologies caused by adjusting video play progress with a finger to touch a screen can be resolved, where the problem of play position jump causes that a final play position is not a play position desired by the user.

It should be understood that, in this embodiment of this disclosure, the radio frequency unit 1001 may be configured to send or receive a signal in an information sending/receiving or call process. For example, the radio frequency unit 1001 receives downlink data from a base station and sends the downlink data to the processor 1010 for processing; and sends uplink data to the base station. Generally, the radio frequency unit 1001 includes but is not limited to an antenna, at least one amplifier, a transceiver, a coupler, a low noise amplifier, a duplexer, and the like. In addition, the radio frequency unit 1001 may further communicate with a network and another device through a wireless communications system.

The terminal device provides the user with wireless broadband Internet access by using the network module 1002, for example, helping the user send or receive an email, browse a web page, and access streaming media.

The audio output unit 1003 may convert audio data received by the radio frequency unit 1001 or the network module 1002 or stored in the memory 1009 into an audio signal and output the audio signal as a sound. In addition, the audio output unit 1003 may further provide audio output (for example, a call signal received sound or a message received sound) that is related to a specific function performed by the terminal device 1000. The audio output unit 1003 includes a speaker, a buzzer, a telephone receiver, and the like.

The input unit 1004 is configured to receive an audio or video signal. The input unit 1004 may include a graphics processing unit (Graphics Processing Unit, GPU) 10041 and a microphone 10042. The graphics processing unit 10041 processes image data of a static picture or a video that is obtained by an image capture apparatus (for example, a camera) in a video capture mode or an image capture mode. A processed image frame may be displayed on the display unit 1006. An image frame processed by the graphics processing unit 10041 may be stored in the memory 1009 (or another storage medium) or sent by the radio frequency unit 1001 or the network module 1002. The microphone 10042 can receive a sound and can process the sound into audio data. The processed audio data can be converted, for outputting, into a format that can be sent to a mobile communication base station through the radio frequency unit 1001 in a telephone call mode.

The terminal device 1000 further includes at least one sensor 1005, for example, an optical sensor, a motion sensor, and other sensors. For example, the optical sensor includes an ambient light sensor and a proximity sensor. The ambient light sensor may adjust brightness of a display panel 10061 based on intensity of ambient light. When the terminal device 1000 moves near an ear, the proximity sensor may disable the display panel 10061 and/or backlight. As a motion sensor, an accelerometer sensor may magnitudes of acceleration in various directions (there are usually three axes), may detect a value and a direction of gravity when the terminal is static, and may be configured for terminal posture recognition (for example, for landscape/portrait mode switching, related gaming, or magnetometer posture calibration), functions related to vibration recognition (for example, for a pedometer or tapping), and the like. The sensor 1005 may further include a fingerprint sensor, a pressure sensor, an iris sensor, a molecular sensor, a gyroscope, a barometer, a hygrometer, a thermometer, an infrared sensor, and the like, where the infrared sensor can measure a distance between an object and the terminal device by transmitting and receiving infrared light. Details are not described herein.

The display unit 1006 is configured to display information input by the user or information provided for the user. The display unit 1006 may include the display panel 10061, and the display panel 10061 may be configured in the form of a liquid crystal display (LCD), an organic light-emitting diode (OLED), or the like.

The user input unit 1007 may be configured to receive entered numerical or character information, and generate key signal input that is related to user setting and function control of the terminal device. For example, the user input unit 1007 includes a touch panel 10071 and other input devices 10072. The touch panel 10071, also referred to as a touchscreen, may capture a touch operation performed by a user on or near the touch panel (for example, an operation performed by the user on the touch panel 10071 or near the touch panel 10071 by using any appropriate object or accessory such as a finger or a stylus). The touch panel 10071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 1010, and receives and executes a command sent by the processor 1010. In addition, the touch panel 10071 may be implemented in a plurality of forms, for example, as a resistive, capacitive, infrared, or surface acoustic wave touch panel. The user input unit 1007 may further include other input devices 10072 in addition to the touch panel 10071. For example, the other input devices 10072 may include but are not limited to a physical keyboard, a function key (such as a volume control key or a power on/off key), a trackball, a mouse, a joystick, and the like. Details are not described herein.

Further, the touch panel 10071 may cover the display panel 10061. After detecting a touch operation on or near the touch panel 10071, the touch panel 10071 transmits the touch operation to the processor 1010 to determine a type of a touch event. Then the processor 1010 provides corresponding visual output on the display panel 10061 based on the type of the touch event. In FIG. 10, the touch panel 10071 and the display panel 10061 serve as two separate components to implement input and output functions of the terminal device. However, in some embodiments, the touch panel 10071 and the display panel 10061 may be integrated to implement the input and output functions of the terminal device. This is not specifically limited herein.

The interface unit 1008 is an interface for connecting an external apparatus to the terminal device 1000. For example, the external apparatus may include a wired or wireless headphone port, an external power (or battery charger) port, a wired or wireless data port, a memory card port, a port for connecting an apparatus having a recognition module, an audio input/output (I/O) port, a video I/O port, an earphone port, and the like. The interface unit 1008 may be configured to receive input (for example, data information and electric power) from the external apparatus, and transmit the received input to one or more elements in the terminal device 1000; or may be configured to transmit data between the terminal device 1000 and the external apparatus.

The memory 1009 may be configured to store software programs and various data. The memory 1009 may mainly include a program storage area and a data storage area. The program storage area may store an operating system, an application program required for at least one function (such as a sound play function and an image play function), and the like. The data storage area may store data (such as audio data and a phone book) created based on use of a mobile phone, and the like. In addition, the memory 1009 may include a high-speed random access memory, or may include a non-volatile memory, for example, at least one magnetic disk storage device, a flash memory device, or other volatile solid-state storage devices.

The processor 1010 is a control center of the terminal device, uses various interfaces and lines to connect all parts of the entire terminal device, and performs various functions and data processing of the terminal device by running or executing the software program and/or module stored in the memory 1009 and invoking data stored in the memory 1009, thereby performing overall monitoring on the terminal device. The processor 1010 may include one or more processing units. For example, the processor 1010 may integrate an application processor and a modem processor. The application processor mainly processes the operating system, a user interface, an application program, and the like. The modem processor mainly processes wireless communication. It may be understood that the modem processor may alternatively not be integrated into the processor 1010.

The terminal device 1000 may further include a power supply 1011 (for example, a battery) that supplies power to each component. For example, the power supply 1011 may be logically connected to the processor 1010 by using a power management system, so as to implement functions such as charging management, discharging management, and power consumption management by using the power management system.

In addition, the terminal device 1000 includes some functional modules that are not illustrated. Details are not described herein.

For example, an embodiment of this disclosure further provides a terminal device, which may include a processor 1010, a memory 1009, and a computer program stored in the memory 1009 and capable of running on the processor 1010. When the computer program is executed by the processor 1010, the processes of the foregoing method embodiment shown in FIG. 1 are implemented, with the same technical effects achieved. To avoid repetition, details are not described herein again.

An embodiment of this disclosure further provides a non-transitory computer-readable storage medium, where the non-transitory computer-readable storage medium stores a computer program, and when the computer program is executed by a processor, the processes of the foregoing method shown in FIG. 1 are implemented, with the same technical effects achieved. To avoid repetition, details are not described herein again. For example, the computer-readable storage medium is a read-only memory (ROM), a random access memory (RAM), a magnetic disk, an optical disk, or the like.

A person skilled in the art should understand that the embodiments of this disclosure may be provided as a method, a system, or a computer program product. Therefore, this disclosure may use a form of hardware only embodiments, software only embodiments, or embodiments with a combination of software and hardware. Moreover, this disclosure may use a form of a computer program product that is implemented on one or more computer-usable storage media (including but not limited to a disk memory, a CD-ROM, an optical memory, and the like) that include computer-usable program code.

It should be noted that the terms "include", "comprise", or any other variations thereof are intended to cover a non-exclusive inclusion, so that a process, a method, a commodity, or a device including a set of elements not only includes those elements but also includes other elements that are not expressly listed, or further includes elements inherent to such process, method, commodity, or device. In absence of more constraints, an element preceded by the statement "includes a . . . " does not preclude existence of identical elements in the process, method, commodity, or device that includes the element.

The foregoing descriptions are only embodiments of this disclosure, but this disclosure is not limited to such embodiments. For a person skilled in the art, this disclosure may have various changes and variations. Any modification, equivalent replacement, and improvement made without departing from the spirit and principle of this disclosure shall fall within the protection scope of the claims of this disclosure.

What is claimed is:

1. A method for controlling play of a multimedia file, applied to a terminal device comprising a first screen and a second screen, the method comprising:
   receiving a bending input by a user to a target screen, the bending input being used to trigger changing of a folding angle between the first screen and the second screen; and
   adjusting a play parameter of a target multimedia file in response to the bending input, wherein
   the target screen is the first screen or the second screen;
   when the play parameter comprises a play progress and is adjusted based on a bending direction and a folding angle variation value of the bending input, for fast forward adjustment, fast forward duration is correlated with the folding angle variation value, and for fast backward adjustment, fast backward duration is correlated with the folding angle variation value; and
   when the play parameter comprises the play progress and a play speed, and is adjusted based on the bending direction, a bending speed and the folding angle variation value of the bending input, for the fast forward adjustment, a fast forward rate is correlated with the bending speed, and the fast forward duration is correlated with the folding angle variation value, for the fast backward adjustment, a fast backward rate is correlated with the bending speed, and the fast backward duration is correlated with the folding angle variation value.

2. The method according to claim 1, wherein the adjusting the play parameter of the target multimedia file in response to the bending input comprises:
   obtaining the bending direction and the folding angle variation value of the bending input;
   determining a first adjusting mode based on the bending direction; and
   adjusting the play progress of the target multimedia file based on the first adjusting mode and the folding angle variation value.

3. The method according to claim 2, wherein the adjusting the play progress of the target multimedia file based on the first adjusting mode and the folding angle variation value comprises:
   in a case that the first adjusting mode is the fast forward adjustment, controlling, based on the folding angle variation value, the play progress of the target multimedia file to move fast forward; and
   in a case that the first adjusting mode is the fast backward adjustment, controlling, based on the folding angle variation value, the play progress of the target multimedia file to move fast backward.

4. The method according to claim 2, wherein the target multimedia file is a file played by a multimedia play interface displayed on at least one of the first screen or the second screen, the multimedia play interface comprises a progress bar for adjusting the multimedia play progress; and
   the adjusting the play progress of the target multimedia file based on the first adjusting mode and the folding angle variation value further comprises:
   updating a display position of a slider on the progress bar based on the first adjusting mode and the folding angle variation value.

5. The method according to claim 1, wherein the adjusting the play parameter of the target multimedia file in response to the bending input comprises:
   obtaining the bending direction, the bending speed, and the folding angle variation value of the bending input;
   determining a second adjusting mode based on the bending direction; and
   adjusting the play speed of the target multimedia file based on the second adjusting mode, the bending speed, and the folding angle variation value.

6. The method according to claim 5, wherein the adjusting the play speed of the target multimedia file based on the second adjusting mode, the bending speed, and the folding angle variation value comprises:
   in a case that the second adjusting mode is the fast forward adjustment, controlling, based on the bending speed and the folding angle variation value, the target multimedia file to be played fast forward; and
   in a case that the second adjusting mode is the fast backward adjustment, controlling, based on the bending speed and the folding angle variation value, the target multimedia file to be played fast backward.

7. A terminal device, comprising a processor, a memory, and a computer program stored in the memory and capable of running on the processor, wherein the computer program, when executed by the processor, causes the processor to perform:
   receiving a bending input by a user to a target screen, the bending input being used to trigger changing of a folding angle between a first screen and a second screen of the terminal device; and adjusting a play parameter of a target multimedia file in response to the bending input, wherein the target screen is the first screen or the second screen;

when the play parameter comprises a play progress, and is adjusted based on a bending direction and a folding angle variation value of the bending input, for fast forward adjustment, fast forward duration is correlated with the folding angle variation value, and for fast backward adjustment, fast backward duration is correlated with the folding angle variation value; and when the play parameter comprises the play progress and a play speed, and is adjusted based on the bending direction, a bending speed and the folding angle variation value of the bending input, for the fast forward adjustment, a fast forward rate is correlated with the bending speed, and the fast forward duration is correlated with the folding angle variation value, for the fast backward adjustment, a fast backward rate is correlated with the bending speed, and the fast backward duration is correlated with the folding angle variation value.

8. The terminal device according to claim 7, wherein the computer program, when executed by the processor, causes the processor to perform:

obtaining the bending direction and the folding angle variation value of the bending input;

determining a first adjusting mode based on the bending direction; and adjusting the play progress of the target multimedia file based on the first adjusting mode and the folding angle variation value.

9. The terminal device according to claim 8, wherein the computer program, when executed by the processor, causes the processor to perform:

in a case that the first adjusting mode is the fast forward adjustment, controlling, based on the folding angle variation value, the play progress of the target multimedia file to move fast forward; and in a case that the first adjusting mode is the fast backward adjustment, controlling, based on the folding angle variation value, the play progress of the target multimedia file to move fast backward.

10. The terminal device according to claim 8, wherein the target multimedia file is a file played by a multimedia play interface displayed on at least one of the first screen or the second screen, the multimedia play interface comprises a progress bar for adjusting the multimedia play progress; and the computer program, when executed by the processor, causes the processor to perform:

updating a display position of a slider on the progress bar based on the first adjusting mode and the folding angle variation value.

11. The terminal device according to claim 7, wherein the computer program, when executed by the processor, causes the processor to perform:

obtaining the bending direction, the bending speed, and the folding angle variation value of the bending input;

determining a second adjusting mode based on the bending direction; and adjusting the play speed of the target multimedia file based on the second adjusting mode, the bending speed, and the folding angle variation value.

12. The terminal device according to claim 11, wherein the computer program, when executed by the processor, causes the processor to perform:

in a case that the second adjusting mode is the fast forward adjustment, controlling, based on the bending speed and the folding angle variation value, the target multimedia file to be played fast forward; and in a case that the second adjusting mode is the fast backward adjustment, controlling, based on the bending speed and the folding angle variation value, the target multimedia file to be played fast backward.

13. A non-transitory computer-readable storage medium, wherein the non-transitory computer-readable storage medium stores a computer program that, when executed by a processor, causes the processor to perform:

receiving a bending input by a user to a target screen, the bending input being used to trigger changing of a folding angle between a first screen and a second screen of a terminal device; and adjusting a play parameter of a target multimedia file in response to the bending input, wherein the target screen is the first screen or the second screen, and the play parameter comprises at least one of play progress or play speed;

when the play parameter comprises a play progress, and is adjusted based on a bending direction and a folding angle variation value of the bending input, for fast forward adjustment, fast forward duration is correlated with the folding angle variation value, and for fast backward adjustment, fast backward duration is correlated with the folding angle variation value; and when the play parameter comprises the play progress and a play speed, and is adjusted based on the bending direction, a bending speed and the folding angle variation value of the bending input, for the fast forward adjustment, a fast forward rate is correlated with the bending speed, and the fast forward duration is correlated with the folding angle variation value, for the fast backward adjustment, a fast backward rate is correlated with the bending speed, and the fast backward duration is correlated with the folding angle variation value.

14. The non-transitory computer-readable storage medium according to claim 13, wherein the computer program, when executed by the processor, causes the processor to perform:

obtaining the bending direction and the folding angle variation value of the bending input;

determining a first adjusting mode based on the bending direction; and adjusting the play progress of the target multimedia file based on the first adjusting mode and the folding angle variation value.

15. The non-transitory computer-readable storage medium according to claim 14, wherein the computer program, when executed by the processor, causes the processor to perform:

in a case that the first adjusting mode is the fast forward adjustment, controlling, based on the folding angle variation value, the play progress of the target multimedia file to move fast forward; and in a case that the first adjusting mode is the fast backward adjustment, controlling, based on the folding angle variation value, the play progress of the target multimedia file to move fast backward.

16. The non-transitory computer-readable storage medium according to claim 14, wherein the target multimedia file is a file played by a multimedia play interface displayed on at least one of the first screen or the second screen, the multimedia play interface comprises a progress bar for adjusting the multimedia play progress; and the computer program, when executed by the processor, causes the processor to perform:
updating a display position of a slider on the progress bar based on the first adjusting mode and the folding angle variation value.

17. The non-transitory computer-readable storage medium according to claim 13, wherein the computer program, when executed by the processor, causes the processor to perform:
   obtaining the bending direction, the bending speed, and the folding angle variation value of the bending input;
   determining a second adjusting mode based on the bending direction; and
   adjusting the play speed of the target multimedia file based on the second adjusting mode, the bending speed, and the folding angle variation value.

18. The non-transitory computer-readable storage medium according to claim 17, wherein the computer program, when executed by the processor, causes the processor to perform:
   in a case that the second adjusting mode is the fast forward adjustment, controlling, based on the bending speed and the folding angle variation value, the target multimedia file to be played fast forward; and
   in a case that the second adjusting mode is the fast backward adjustment, controlling, based on the bending speed and the folding angle variation value, the target multimedia file to be played fast backward.

19. The method according to claim 6, wherein the controlling, based on the bending speed and the folding angle variation value, the target multimedia file to be played fast forward comprises:
   determining a fast forward multiple of the target multimedia file according to a range of the bending speed; and
   controlling the target multimedia file to be played fast forward according to the fast forward multiple and the folding angle variation value; and
   the controlling, based on the bending speed and the folding angle variation value, the target multimedia file to be played fast backward comprises:
   determining a fast backward multiple of the target multimedia file according to the range of the bending speed; and
   controlling the target multimedia file to be played fast backward according to the fast backward multiple and the folding angle variation value.

20. The terminal device according to claim 12, wherein the computer program, when executed by the processor, causes the processor to perform:
   determining a fast forward multiple of the target multimedia file according to a range of the bending speed; and
   controlling the target multimedia file to be played fast forward according to the fast forward multiple and the folding angle variation value; and
   the computer program, when executed by the processor, causes the processor to perform:
   determining a fast backward multiple of the target multimedia file according to the range of the bending speed; and
   controlling the target multimedia file to be played fast backward according to the fast backward multiple and the folding angle variation value.

* * * * *